(12) United States Patent
Nandy et al.

(10) Patent No.: US 9,502,028 B2
(45) Date of Patent: Nov. 22, 2016

(54) ACOUSTIC ACTIVITY DETECTION APPARATUS AND METHOD

(71) Applicant: Knowles Electronics LLC, Itasca, IL (US)

(72) Inventors: Dibyendu Nandy, Naperville, IL (US); Yang Li, Elk Grove Village, IL (US); Henrik Thomsen, Holte (DK); Claus Furst, Roskilde (DK)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/512,877

(22) Filed: Oct. 13, 2014

(65) Prior Publication Data

US 2015/0112689 A1   Apr. 23, 2015

Related U.S. Application Data

(60) Provisional application No. 61/892,755, filed on Oct. 18, 2013.

(51) Int. Cl.
| | |
|---|---|
| *G10L 15/22* | (2006.01) |
| *G10L 15/20* | (2006.01) |
| *G10L 19/002* | (2013.01) |
| *G06F 1/32* | (2006.01) |
| *G10L 25/84* | (2013.01) |
| *G10L 15/08* | (2006.01) |
| *G10L 15/28* | (2013.01) |

(52) U.S. Cl.
CPC ............. *G10L 15/20* (2013.01); *G06F 1/32* (2013.01); *G10L 19/002* (2013.01); *G10L 25/84* (2013.01); *G10L 15/28* (2013.01); *G10L 2015/088* (2013.01)

(58) Field of Classification Search
CPC ............. G10L 15/20; G10L 25/84; G10L 19/002; G10L 15/28; G10L 2015/088; G06F 3/165; G06F 1/32
USPC ............. 704/270.1, 275, 273, 246, 233, 214
See application file for complete search history.

(56) References Cited

U.S. PATENT DOCUMENTS

| | | |
|---|---|---|
| 4,052,568 A | 10/1977 | Jankowski |
| 5,577,164 A | 11/1996 | Kaneko |
| 5,598,447 A | 1/1997 | Usui |

(Continued)

FOREIGN PATENT DOCUMENTS

| | | |
|---|---|---|
| JP | 2001236095 | 8/2001 |
| JP | 2004219728 | 8/2004 |

(Continued)

OTHER PUBLICATIONS

"MEMS technologies: Microphone" EE Herald Jun. 20, 2013.

(Continued)

*Primary Examiner* — Marcellus Augustin
(74) *Attorney, Agent, or Firm* — Foley & Lardner LLP

(57) ABSTRACT

Streaming audio is received. The streaming audio includes a frame having plurality of samples. An energy estimate is obtained for the plurality of samples. The energy estimate is compared to at least one threshold. In addition, a band pass estimate of the signal is determined. An energy estimate is obtained for the band-passed plurality of samples. The two energy estimates are compared to at least one threshold each. Based upon the comparison operation, a determination is made as to whether speech is detected.

22 Claims, 4 Drawing Sheets

(56) References Cited

U.S. PATENT DOCUMENTS

| | | |
|---|---|---|
| 5,675,808 A | 10/1997 | Gulick |
| 5,822,598 A | 10/1998 | Lam |
| 5,983,186 A | 11/1999 | Miyazawa et al. |
| 6,049,565 A | 4/2000 | Paradine |
| 6,057,791 A | 5/2000 | Knapp |
| 6,070,140 A | 5/2000 | Tran |
| 6,154,721 A | 11/2000 | Sonnic |
| 6,249,757 B1 | 6/2001 | Cason |
| 6,282,268 B1 | 8/2001 | Hughes |
| 6,324,514 B2 | 11/2001 | Matulich |
| 6,397,186 B1 | 5/2002 | Bush |
| 6,453,020 B1 | 9/2002 | Hughes et al. |
| 6,453,291 B1* | 9/2002 | Ashley .................. G10L 25/78 704/200 |
| 6,564,330 B1 | 5/2003 | Martinez |
| 6,591,234 B1 | 7/2003 | Chandran |
| 6,640,208 B1* | 10/2003 | Zhang .................. G10L 25/93 704/214 |
| 6,756,700 B2 | 6/2004 | Zeng |
| 6,810,273 B1* | 10/2004 | Mattila ............... G10L 21/0208 370/286 |
| 7,190,038 B2 | 3/2007 | Dehe |
| 7,415,416 B2 | 8/2008 | Rees |
| 7,473,572 B2 | 1/2009 | Dehe |
| 7,619,551 B1 | 11/2009 | Wu |
| 7,630,504 B2 | 12/2009 | Poulsen |
| 7,774,202 B2 | 8/2010 | Spengler |
| 7,774,204 B2 | 8/2010 | Mozer |
| 7,781,249 B2 | 8/2010 | Laming |
| 7,795,695 B2 | 9/2010 | Weigold |
| 7,825,484 B2 | 11/2010 | Martin |
| 7,829,961 B2 | 11/2010 | Hsiao |
| 7,856,283 B2 | 12/2010 | Burk |
| 7,856,804 B2 | 12/2010 | Laming |
| 7,903,831 B2 | 3/2011 | Song |
| 7,936,293 B2 | 5/2011 | Hamashita |
| 7,941,313 B2 | 5/2011 | Garudadri |
| 7,957,972 B2 | 6/2011 | Huang |
| 7,994,947 B1 | 8/2011 | Ledzius |
| 8,171,322 B2 | 5/2012 | Fiennes |
| 8,208,621 B1 | 6/2012 | Hsu |
| 8,275,148 B2 | 9/2012 | Li |
| 8,331,581 B2 | 12/2012 | Pennock |
| 8,666,751 B2 | 3/2014 | Murthi |
| 8,687,823 B2 | 4/2014 | Loeppert |
| 8,731,210 B2 | 5/2014 | Cheng |
| 8,798,289 B1 | 8/2014 | Every |
| 8,804,974 B1 | 8/2014 | Melanson |
| 8,849,231 B1 | 9/2014 | Murgia |
| 8,972,252 B2 | 3/2015 | Hung |
| 8,996,381 B2 | 3/2015 | Mozer |
| 9,020,819 B2 | 4/2015 | Saitoh |
| 9,043,211 B2 | 5/2015 | Haiut |
| 9,059,630 B2 | 6/2015 | Gueorguiev |
| 9,073,747 B2 | 7/2015 | Ye |
| 9,076,447 B2 | 7/2015 | Nandy |
| 9,111,548 B2 | 8/2015 | Nandy |
| 9,112,984 B2 | 8/2015 | Sejnoha |
| 9,113,263 B2 | 8/2015 | Furst |
| 9,119,150 B1 | 8/2015 | Murgia |
| 9,142,215 B2 | 9/2015 | Rosner |
| 9,147,397 B2 | 9/2015 | Thomsen |
| 9,161,112 B2 | 10/2015 | Ye |
| 2002/0054588 A1 | 5/2002 | Mehta |
| 2002/0116186 A1 | 8/2002 | Strauss et al. |
| 2002/0123893 A1 | 9/2002 | Woodward |
| 2002/0184015 A1 | 12/2002 | Li et al. |
| 2003/0004720 A1 | 1/2003 | Garudadri |
| 2003/0061036 A1 | 3/2003 | Garudadri |
| 2003/0144844 A1 | 7/2003 | Colmenarez et al. |
| 2004/0022379 A1 | 2/2004 | Klos |
| 2005/0207605 A1 | 9/2005 | Dehe |
| 2006/0074658 A1 | 4/2006 | Chadha |
| 2006/0233389 A1 | 10/2006 | Mao |
| 2006/0247923 A1 | 11/2006 | Chandran |
| 2007/0168908 A1 | 7/2007 | Paolucci |
| 2007/0278501 A1 | 12/2007 | MacPherson |
| 2008/0089536 A1 | 4/2008 | Josefsson |
| 2008/0175425 A1 | 7/2008 | Roberts |
| 2008/0201138 A1* | 8/2008 | Visser .................. G10L 21/0208 704/227 |
| 2008/0267431 A1 | 10/2008 | Leidl |
| 2008/0279407 A1 | 11/2008 | Pahl |
| 2008/0283942 A1 | 11/2008 | Huang |
| 2009/0001553 A1 | 1/2009 | Pahl |
| 2009/0180655 A1 | 7/2009 | Tien |
| 2010/0046780 A1 | 2/2010 | Song |
| 2010/0052082 A1 | 3/2010 | Lee |
| 2010/0057474 A1 | 3/2010 | Kong |
| 2010/0128894 A1 | 5/2010 | Petit et al. |
| 2010/0128914 A1 | 5/2010 | Khenkin |
| 2010/0131783 A1 | 5/2010 | Weng |
| 2010/0183181 A1 | 7/2010 | Wang |
| 2010/0246877 A1 | 9/2010 | Wang |
| 2010/0290644 A1 | 11/2010 | Wu |
| 2010/0292987 A1 | 11/2010 | Kawaguchi |
| 2010/0322443 A1 | 12/2010 | Wu |
| 2010/0322451 A1 | 12/2010 | Wu |
| 2011/0007907 A1* | 1/2011 | Park .................... G10K 11/178 381/71.8 |
| 2011/0013787 A1 | 1/2011 | Chang |
| 2011/0029109 A1 | 2/2011 | Thomsen |
| 2011/0075875 A1 | 3/2011 | Wu |
| 2011/0106533 A1 | 5/2011 | Yu |
| 2011/0208520 A1 | 8/2011 | Lee |
| 2011/0280109 A1 | 11/2011 | Raymond |
| 2012/0010890 A1 | 1/2012 | Koverzin |
| 2012/0232896 A1 | 9/2012 | Taleb et al. |
| 2012/0250881 A1 | 10/2012 | Mulligan |
| 2012/0310641 A1 | 12/2012 | Niemisto |
| 2013/0044898 A1 | 2/2013 | Schultz |
| 2013/0058506 A1 | 3/2013 | Boor |
| 2013/0223635 A1 | 8/2013 | Singer |
| 2013/0226324 A1 | 8/2013 | Hannuksela |
| 2013/0246071 A1 | 9/2013 | Lee |
| 2013/0322461 A1 | 12/2013 | Poulsen |
| 2013/0343584 A1 | 12/2013 | Bennett |
| 2014/0064523 A1 | 3/2014 | Kropfitsch |
| 2014/0122078 A1 | 5/2014 | Joshi |
| 2014/0143545 A1 | 5/2014 | McKeeman |
| 2014/0163978 A1 | 6/2014 | Basye |
| 2014/0177113 A1 | 6/2014 | Gueorguiev |
| 2014/0188467 A1 | 7/2014 | Jing |
| 2014/0188470 A1 | 7/2014 | Chang |
| 2014/0197887 A1 | 7/2014 | Hovesten |
| 2014/0236582 A1* | 8/2014 | Raychowdhury ....... G10L 25/84 704/205 |
| 2014/0244269 A1 | 8/2014 | Tokutake |
| 2014/0244273 A1 | 8/2014 | Laroche |
| 2014/0249820 A1 | 9/2014 | Hsu |
| 2014/0257813 A1 | 9/2014 | Mortensen |
| 2014/0257821 A1 | 9/2014 | Adams |
| 2014/0274203 A1 | 9/2014 | Ganong |
| 2014/0278435 A1 | 9/2014 | Ganong |
| 2014/0281628 A1 | 9/2014 | Nigam |
| 2014/0343949 A1 | 11/2014 | Huang |
| 2014/0348345 A1 | 11/2014 | Furst |
| 2014/0358552 A1 | 12/2014 | Xu |
| 2015/0039303 A1 | 2/2015 | Lesso |
| 2015/0043755 A1 | 2/2015 | Furst |
| 2015/0046157 A1 | 2/2015 | Wolff |
| 2015/0046162 A1 | 2/2015 | Aley-Raz |
| 2015/0049884 A1 | 2/2015 | Ye |
| 2015/0055803 A1 | 2/2015 | Qutub |
| 2015/0058001 A1 | 2/2015 | Dai |
| 2015/0063594 A1 | 3/2015 | Nielsen |
| 2015/0073780 A1 | 3/2015 | Sharma |
| 2015/0073785 A1 | 3/2015 | Sharma |
| 2015/0088500 A1 | 3/2015 | Conliffe |
| 2015/0106085 A1 | 4/2015 | Lindahl |
| 2015/0110290 A1 | 4/2015 | Furst |
| 2015/0112690 A1 | 4/2015 | Guha |
| 2015/0134331 A1 | 5/2015 | Millet |
| 2015/0154981 A1 | 6/2015 | Barreda |

(56) References Cited

U.S. PATENT DOCUMENTS

| | | |
|---|---|---|
| 2015/0161989 A1 | 6/2015 | Hsu |
| 2015/0195656 A1 | 7/2015 | Ye |
| 2015/0206527 A1 | 7/2015 | Connolly |
| 2015/0256660 A1 | 9/2015 | Kaller |
| 2015/0256916 A1 | 9/2015 | Volk |
| 2015/0287401 A1 | 10/2015 | Lee |
| 2015/0302865 A1 | 10/2015 | Pilli |
| 2015/0304502 A1 | 10/2015 | Pilli |
| 2015/0350760 A1 | 12/2015 | Nandy |
| 2015/0350774 A1 | 12/2015 | Furst |
| 2016/0012007 A1 | 1/2016 | Popper |
| 2016/0087596 A1 | 3/2016 | Yurrtas |
| 2016/0133271 A1 | 5/2016 | Kuntzman |
| 2016/0134975 A1 | 5/2016 | Kuntzman |

FOREIGN PATENT DOCUMENTS

| | | |
|---|---|---|
| WO | 2009130591 | 10/2009 |
| WO | 2011106065 | 9/2011 |
| WO | 2011140096 | 11/2011 |
| WO | 2013049358 | 4/2013 |
| WO | 2013085499 A1 | 6/2013 |

OTHER PUBLICATIONS

Delta-sigma modulation, Wikipedia (Jul. 4, 2013).
Pulse-density modulation, Wikipedia (May 3, 2013).
Kite, Understanding PDM Digital Audio, Audio Precision, Beaverton, OR, 2012.
International Search Report and Written Opinion for PCT/US2014/060567 dated Jan. 16, 2015 (12 pages).
International Search Report and Written Opinion for PCT/EP2014/064324, dated Feb. 12, 2015 (13 pages).
International Search Report and Written Opinion for PCT/US2014/038790, dated Sep. 24, 2014 (9 pages).
International Search Report and Written Opinion for PCT/US2014/062861 dated Jan. 23, 2015 (12 pages).
U.S. Appl. No. 14/285,585, filed May 22, 2014, Santos.
U.S. Appl. No. 14/495,482, filed Sep. 24, 2014, Murgia.
U.S. Appl. No. 14/522,264, filed Oct. 23, 2014, Murgia.
U.S. Appl. No. 14/698,652, filed Apr. 28, 2015, Yapanel.
U.S. Appl. No. 14/749,425, filed Jun. 24, 2015, Verma.
U.S. Appl. No. 14/853,947, filed Sep. 14, 2015, Yen.
U.S. Appl. No. 62/100,758, filed Jan. 7, 2015, Rossum.
International Search Report and Written Opinion for PCT/US2016/013859 dated Apr. 29, 2016 (12 pages).
Search Report of Taiwan Patent Application No. 103135811, dated Apr. 18, 2016 (1 page).

\* cited by examiner

ACOUSTIC ACTIVITY DETECTION APPARATUS AND METHOD

CROSS REFERENCE TO RELATED APPLICATION

This patent claims benefit under 35 U.S.C. §119 (e) to U.S. Provisional Application No. 61/892,755 entitled "Acoustic Activity Detection Apparatus and Method" filed Oct. 18, 2013, the content of which is incorporated herein by reference in its entirety.

TECHNICAL FIELD

This application relates to speech interfaces and, more specifically, to activity detection approaches utilized in these applications.

BACKGROUND

Speech interfaces have become important features in mobile devices today. Some devices have the capability to respond to speech even when the device's display is off and in some form of low power mode and potentially at some distance from the user. These requirements place significant demands on system design and performance including the need to keep the microphone in an "always listening" mode.

In other examples, the device keeps only parts of the signal chain powered up, e.g. the microphone and a digital signal processor (DSP) or central processing unit (CPU), with an algorithm for detecting a "voice trigger." Upon recognizing a voice trigger, the rest of the system is powered up from its sleep mode to perform the desired computational task.

The above-mentioned previous approaches suffer from several disadvantages. For example, these approaches tend to utilize or waste much power. This waste of power reduces the battery life of such systems. In other examples, the system may suffer from performance issues. These and other disadvantages have resulted in some user dissatisfaction with these previous approaches.

BRIEF DESCRIPTION OF THE DRAWINGS

For a more complete understanding of the disclosure, reference should be made to the following detailed description and accompanying drawings wherein.

Figure 1:
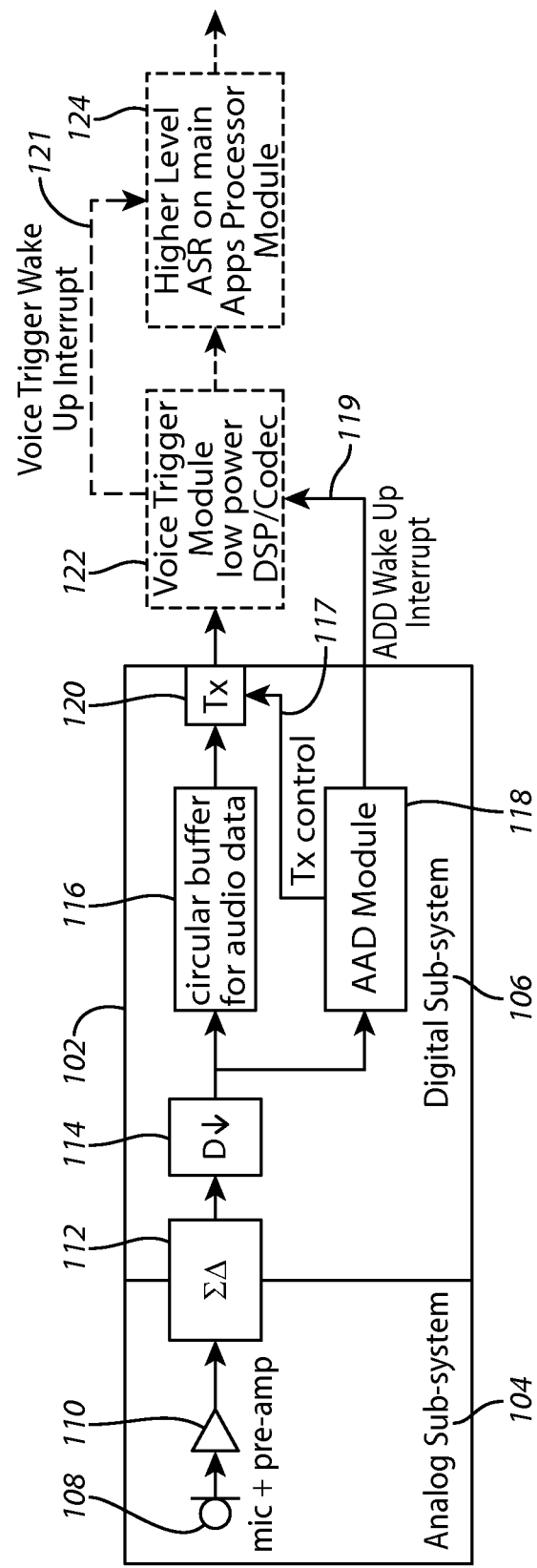
FIG. 1 is a block diagram of a system or apparatus using an Acoustic Activity Detection (AAD) module.

Those of ordinary skill in the art will appreciate that elements in the figures are illustrated for simplicity and clarity. It will be appreciated further that certain actions and/or steps may be described or depicted in a particular order of occurrence while those having ordinary skill in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided for a digital microphone with the built-in capability to distinguish speech and speech-like acoustic activity signals from background noise, to trigger a following digital signal processor (DSP) (or other) module or system, and to provide continuous audio data to the system for detection of a "voice trigger" followed by seamless operation of speech recognition engines. The ability to distinguish speech activity from background allows the following modules in the signal chain to operate in low power "sleep" states, conserving battery power until their operation is required.

To enable such capabilities, a low complexity Acoustic Activity Detection (AAD) module is configured to detect speech with low latency and high probability in high ambient noise. The high noise results in speech signal-to-noise ratios (SNRs) as low as approximately 0 dB. In addition, the present approaches provide a built-in buffer for seamless handover of audio data to the following "voice trigger" detector as well as for the general purpose automatic speech recognizer (ASR) following the voice trigger. The AAD module may be implemented as any combination of computer hardware and software. In one aspect, it may be implemented as computer instructions executed on a processing device such as an application specific integrated circuit (ASIC) or microprocessor. As described herein, the AAD module transforms input signals into control signals that are used to indicate speech detection.

Lower power can be achieved by optimized approaches which can detect speech audio activity with low latency, low computational cost (silicon area), high detection rates and low rate of false triggers. In some aspects, the present approaches utilize a buffer of sufficient depth to store the recorded data for the multi-layered recognition system to work seamlessly and without pauses in speech.

In many of these embodiments, streaming audio is received and the streaming audio comprises a sequence of frames, each having a plurality of samples. An energy estimate is obtained for the plurality of samples. The energy estimate is compared to at least one threshold. Based upon the comparing, a determination is made as to whether speech is detected.

In other aspects, a determination is made as to whether a speech hangover has occurred. In some examples, a non-linear process is used to make the hangover determination. In other examples and when speech is not detected, a determination is made as to the noise level of the plurality of samples.

In others of these embodiments, streaming audio is received, and the streaming audio comprises a sequence of frames, each with a plurality of samples. A first energy estimate is obtained for the frame of the plurality of samples and a second energy estimate is obtained for a band passed signal from the same frame of the plurality of samples. In a first path, the first energy estimate is compared to at least one first threshold and based upon the comparison, a determination is made as to whether speech is detected. In a second path that is performed in parallel with the first path, the second energy estimate is compared to at least one second threshold and based upon the comparing, a determination is made as to whether speech is detected.

In other aspects, a determination is made as to whether a speech hangover has occurred. In some examples, a non-linear process is used to make the hangover determination.

In other examples and when speech is not detected, a determination is made as to the noise level of the plurality of samples.

In others of these embodiments, an apparatus configured to distinguish speech activity from background noise includes an analog sub-system, a conversion module, and a digital sub-system. The analog sub-system converts sound energy into an analog electrical signal. The conversion module is coupled to the analog system and converts the analog signal into a digital signal.

The digital sub-system is coupled to the conversion module, and includes an acoustic activity detection (AAD) module. The AAD module is configured to receive the digital signal. The digital signal comprises a sequence of frames, each having a plurality of samples. The AAD module is configured to obtain an energy estimate for the plurality of samples and compare the energy estimate to at least one threshold. The AAD module is configured to, based upon the comparison, determine whether speech is detected, and when speech is detected transmit an interrupt to a voice trigger module.

In other aspects, the analog sub-system includes a micro-electro-mechanical system (MEMS) transducer element. In other examples, the AAD module is further configured to determine whether a speech hangover has occurred. In yet other aspects, the AAD module enables the transmission of the digital signal by a transmitter module upon the detection of speech.

In other examples, the conversion module comprises a sigma-delta modulator that is configured to convert the analog signal into a single bit stream pulse density modulated (PDM) format. In some examples, the digital subsystem comprises a decimator module that converts the single bit stream pulse density modulated (PDM) format into a pulse code modulated (PCM) format. In other approaches, the pulse code modulated (PCM) audio from the decimator module is stored continuously in a circular buffer and in parallel, also provided to the AAD module for processing.

In some examples, the AAD module enables the transmission of the digital signal by a transmitter module upon the detection of speech. The transmitter module comprises a interpolator and digital sigma-delta modulator, that converts the pulse code modulated (PCM) format back to a single bit stream pulse density modulated (PDM) format.

Referring now to FIG. 1, one example of an apparatus or system that is configured to distinguish speech activity from background noise, to trigger a following DSP (or other) system, and to provide continuous audio data to the system for detection of a "voice trigger" followed by seamless operation of speech recognition engines is described. A sub-system assembly 102 includes an analog subsystem 104 and a digital subsystem 106. The analog subsystem includes a microphone 108, a preamplifier (preamp) 110, and a Sigma-Delta (IA) modulator 112. The digital subsystem includes a decimator 114, a circular buffer 116, an Acoustic Activity Detection (AAD) module 118, and a transmitter 120. A voice trigger module 122 couples to a higher level ASR main applications processor 124. It will be appreciated that the AAD module 118, voice trigger module 122, and high-level ASR main applications processor module 124 may be implemented as any combination of computer hardware and software. For example, any of these elements may be implemented as executable computer instructions that are executed on any type of processing device such as an ASIC or microprocessor.

The microphone device 108 may be any type of microphone that converts sound energy into electrical signals. It may include a diaphragm and a back plate, for example. It also may be a microelectromechanical system (MEMS) device. The function of the preamplifier 110 is to provide impedance matching for the actual transducer and sufficient drive capability for the microphone analog output.

The sub-system 102 is always listening for acoustic activity. These system components are in typically in a low power mode to conserve battery life. The analog sub-system 104 consists of the microphone 108 and the pre-amplifier 110. The pre-amplifier 110 feeds into the Sigma-Delta (IA) modulator 112, which converts analog data to a single bit-stream pulse density modulated (PDM) format. Further, the output of the Sigma-Delta modulator 112 feeds into the decimator 114, which converts the PDM audio to pulse code modulated (PCM) waveform data at a particular sampling rate and bit width. The data is stored via optimal compressive means in the circular buffer 116 of a desired length to allow seamless non-interrupted audio to the processing blocks upstream. The compressed PCM audio data is further reconverted to PDM for the upstream processing block, when that data is required. This is controlled by the transmitter (Tx) 120. The data transmission occurs after the acoustic activity is detected.

When the AAD module 118 detects speech like acoustic activity (by examining a frame of data samples or some other predetermined data element), it sends an interrupt signal 119 to the voice trigger module 122 to wake-up this module and a control signal to the transmitter (Tx) 120 to output audio data. Once the voice trigger module is operational, it runs an algorithm to detect the voice trigger. If a voice trigger is detected, then the higher level ASR main applications processor module 124 is brought out of sleep mode with an interrupt 121 from the voice trigger block 122 as shown. If the AAD module 118 triggers the transmit data using Tx control 117 and consequently detects frames with non-speech data for a pre-set amount of relatively long time, it can turn off the transmitter 120 to signal the voice trigger module 122 to go back to sleep mode to reduce power consumption.

It will be appreciated that there exist latencies associated with a multilayered speech recognition system as described above. These include latency for acoustic activity detection, a delay for wake-up of the voice-trigger module 122, latency for "voice trigger" detection, and delay for wake-up of high-level ASR main applications processor module 124.

There may also be a need for priming the various processing blocks with audio data. The voice trigger module 122 requires audio data from before the acoustic activity detection trigger, i.e. before this block is woken-up from its sleep mode. The high-level ASR main applications processor module 124 requires audio data from before it is brought out of sleep mode. The requirements for audio data before the actual speech onset by both, the voice trigger module 122 and the high-level ASR main applications processor module 124 as well as the latencies of the AAD module 118 (and the "voice trigger" algorithm it implements), requires the use of the buffer 116, which has sufficient depth to allow recognition of speech that follows the "voice trigger" phrase in a seamless manner (without artificial pauses in speech). This is implemented in the circular buffer 116 as shown and described herein.

One advantage of the present approaches is that they do not miss speech onset and have a very low latency for detection. This leads to better performance of the "voice trigger" while reducing the buffer depth size as much as possible. Another goal is to reduce false detects of speech to avoid turning on the "voice trigger" algorithm unnecessarily and thus reducing battery life. In one aspect, the AAD module 118 provides (or helps provide) these results.

The operation of the AAD module 118 is based on frame-by-frame decision making by comparing an energy estimate of the audio signal samples in a frame of audio data to various thresholds for speech and noise. In these regards, a fast time constant based energy measure is estimated. The energy measure is designed to track the speech envelope with low latency. Thresholds for noise and speech levels are computed using energy statistics. The module 118 calculates the speech onset threshold by determining when the energy estimator exceeds a threshold.

Additionally, a band pass module of a similar structure may be introduced to capture fast energy variations occurring in the 2 kHz-5 kHz frequency range. This band pass module improves the detection levels of speech starts with non-vocal fricatives and sibilants. The use of this additional feature is described below with respect to FIG. 3.

Figure 2:
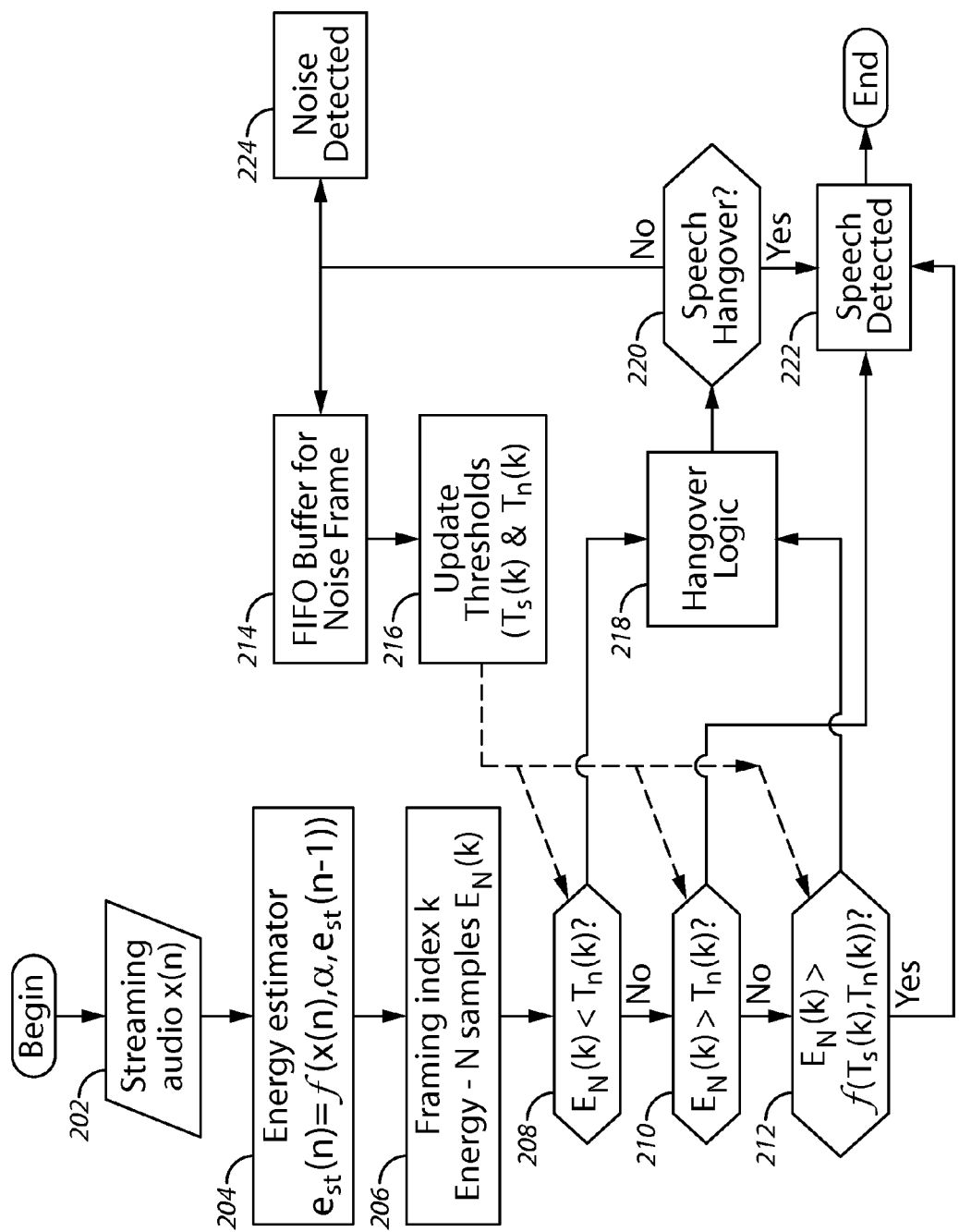
FIG. 2 is a flow chart of an Acoustic Activity Detection (AAD) module.

Referring now to FIG. 2, the acoustic activity detector (AAD) algorithm (e.g., block 118 of FIG. 1) is described. It will be appreciated that these approaches may be implemented as any combination of computer hardware and software. For example, any of these elements or functions may be implemented as executable computer instructions that are executed on any type of processing device such as an ASIC or microprocessor.

At step 202, streaming audio is received. At step 204, energy estimation may be performed. These signals are in the form of a fixed point digital PCM representation of the audio signal. In one example, a leaky integrator or a single pole filter is used to estimate the energy of the signal in a sample by sample basis. This may be based on absolute value of the signal sample. The following equation may be used:

$$e_{st}(n)=(1-\alpha) \times e_{st}(n-1)+\alpha \times |x(n)|$$

Alternatively, a squared value may be used:

$$e_{st}(n)=(1-\alpha) \times e_{st}(n-1)+\alpha \times (x(n))^2$$

At step 206, an energy estimate $E_N(k)$ is then made for an entire frame of N samples as shown below.

$$E_N(k) = \sum_n e_{st}(n)$$

Other examples are possible.

At steps 208, 210, and 212 the frame energy $E_N(k)$, is then compared to various thresholds (as shown in FIG. 2) in a decision tree to arrive at a conclusion of whether speech is detected ($\mathcal{V}(k)=1$) or not ($\mathcal{V}(k)=0$). A hangover logic block is shown at step 218, which uses a non-linear process to determine how long the speech detection flag should be held high immediately after the detection of an apparent non-speech frame. The hangover logic block 218 helps connect discontinuous speech segments caused by pauses in the natural structure of speech by means of the hangover flag $\mathcal{H}(k)$ It also captures the tail ends of words that occur with lower energy and may fall below the detection threshold. An example implementation of the hangover flag is shown in the following equation, though there are other methods that may be derived from this approach or that are similar.

$$\mathcal{H}(k) = \begin{cases} 1, & V(k) = 0 \text{ and } \sum_{m-M}^{m} V(i) = M+1 \forall m \in \{k-K, \ldots, k-1\} \\ 0, & \text{otherwise} \end{cases}$$

At step 220 it is determined if there is a speech hangover. If the answer is affirmative, then execution continues at step 222. If the answer is negative, noise is detected at step 224 and step 214 is executed as described above.

In the event that a frame is declared to be non-speech, it is inserted into a First-in First-out (FIFO) buffer for estimation of the average noise level $\mu_N$, and the standard deviation of the noise level $\sigma_N$. In the following examples, let the contents of the FIFO buffer be terms the energies of the last M frames declared as non-speech $E_N(b)$. Then:

$$\mu_N(k) = \sum_b^M E_N(b)$$

Similarly the standard deviation may be estimated as:

$$\sigma_N(k) = \sqrt{\sum_b [E_N(b) \cdot \mu_N(k)]^2}$$

For computational and hardware efficiency, the frame energy is used in a leaky integrator process to estimate the mean of the noise $\mu_N$ as follows:

$$\mu_N(k)=(1-\beta) \times \mu_N(k-1)+\beta \times E_N(k)$$

Similarly, the standard deviation may be estimated as follows:

$$\sigma_N(k)=(1-\gamma) \times \sigma_N(k-1)+\gamma \times |E_N(k)-\mu_N(k)|$$

The $T_s$ and $T_n$ thresholds are adaptively updated at steps 214 and 216 based on noise statistics from frames in the noise buffer. An estimator for the noise statistics used for calculating thresholds is shown below based on the mean $\mu_N$ and the standard deviation $\sigma_N$ of the frame noise levels estimated.

$$T_n(k)=c \times \mu_N+b \times \min(\sigma_N,d)$$

The parameters "a", "b", "c", "d", and "e" are determined empirically to give the desired performance. The minimum function establishes a maximum value for the update.

The speech threshold is derived as:

$$T_1(k)=\min(\beta \times T_n(k), T_n(k)+C)+e$$

Here the minimum function avoids excessive range of the speech threshold.

If any of the tests performed at steps 208, 210, and 212 are not met, then hangover logic 218 is utilized as described above. If the answers to any of these steps are affirmative, then at step 222 speech is detected and execution ends. Since speech has been detected, an indication that speech has been detected as well as the speech itself can be sent to appropriate circuitry for further processing.

Figure 3:
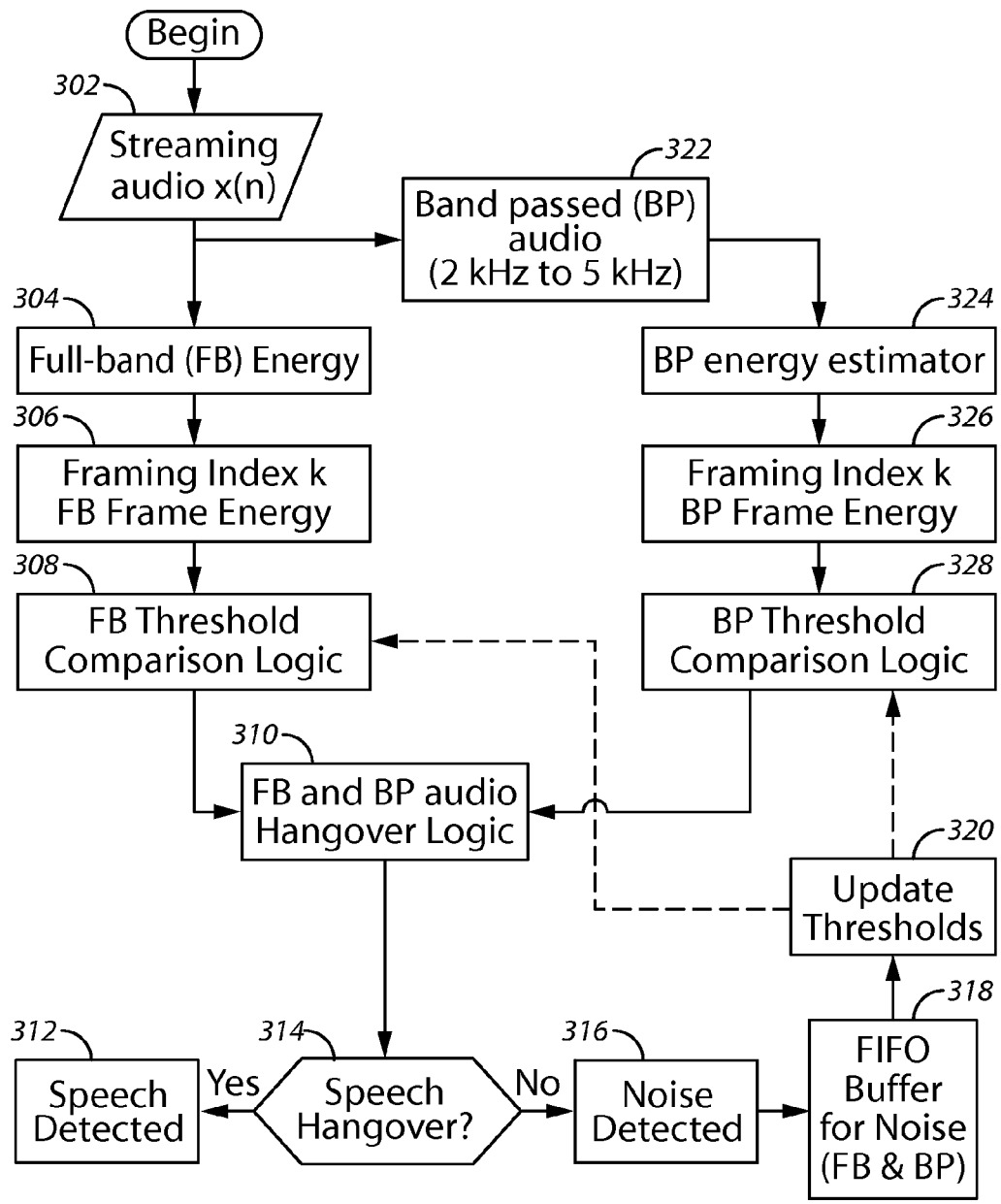
FIG. 3 is a flow chart of another example of an Acoustic Activity Detection (AAD) module.

Referring now to FIG. 3, another implementation may be derived based on similar principles, with the aim of lower latency detection of non-vocal fricatives and sibilants. These sounds are characterized by relatively low energy frequency distributions which are more akin to short bursts of band-passed noise. As with the example of FIG. 2, it will be appreciated that these approaches may be implemented as any combination of computer hardware and software. For example, any of these elements or functions may be implemented as executable computer instructions that are executed on any type of processing device such as an ASIC or microprocessor.

The principle of the algorithm is similar to that shown in the algorithm of FIG. 2 except that a parallel path for energy estimation and detection logic is established using high frequency speech energy in the band from, for example, approximately 2 kHz-5 kHz to capture fricative and sibilant characteristics. Several efficient methods exist to implement the band-pass filter as required. The outputs of the threshold based detection drives the hangover logic block to determine speech or non-speech frames. Equations similar to those used in FIG. 2 may also be used.

More specifically, at step 302 an audio signal is received. At step 304, energy estimation may be performed. At step 306, an energy estimate is then made for an entire frame of N samples.

At step 308, the energy is then compared to various thresholds to arrive at a conclusion of whether speech is detected or not. Execution continues at step 310.

In parallel, at step 322, energy estimation may be performed for band pass frequencies (e.g., approximately 2 kHz-5 kHz). At step 324, an estimate of band pass energy is made. At step 326, an energy estimate is then made for an entire frame of N samples. At step 328, the energy is then compared to various thresholds to arrive at a conclusion of whether speech is detected or not. Execution continues at step 310.

A hangover logic block is shown at step 310, which uses a non-linear process to determine how long the speech detection flag should be held high immediately after the detection of an apparent non-speech frame. The hangover logic block 310 helps connect discontinuous speech segments caused by pauses in the natural structure of speech.

At step 314 it is determined if there is a speech hangover. If the answer is affirmative, then execution continues at step 312 (speech is detected). If the answer is negative, noise is detected at step 316. At step 318 FIFO buffer stores the noise. At step 320, the thresholds are updated.

The detection results for the algorithm shows good performance on a database of several hours of speech with changing ambient noise. The SNR varies from about 20 dB to 0 dB. The database has sentences in noise separated by periods of background noise only.

For purpose of the application, the detection of the onset of speech is accomplished with the lowest possible latency. Speech onset is not missed. For low power requirements, false triggers are minimized. With these goals in mind, results of implementing and executing the algorithm were evaluated according to two principles: low latency detection of the first spoken word in every segment of speech, and the actual accuracy of the detection over all the speech sections in the database. The measures used are standard measures in Hypothesis Testing as defined below:

|  |  | actual value | | total |
|---|---|---|---|---|
|  |  | p | n |  |
| prediction outcome | p' | True Positive | False Positive | P' |
|  | n' | False Negative | True Negative | N' |
|  | total | P | N |  |

A. True positive rate $TPR = \frac{TP}{P}$

|  |  | actual value | | total |
|---|---|---|---|---|
|  |  | p | n |  |
| prediction outcome | p' | True Positive | False Positive | P' |
|  | n' | False Negative | True Negative | N' |
|  | total | P | N |  |

B. False positive rate $FPR = \frac{FP}{N}$

C. Accuracy $ACC = \frac{TP + TN}{P + N}$

Figure 4:
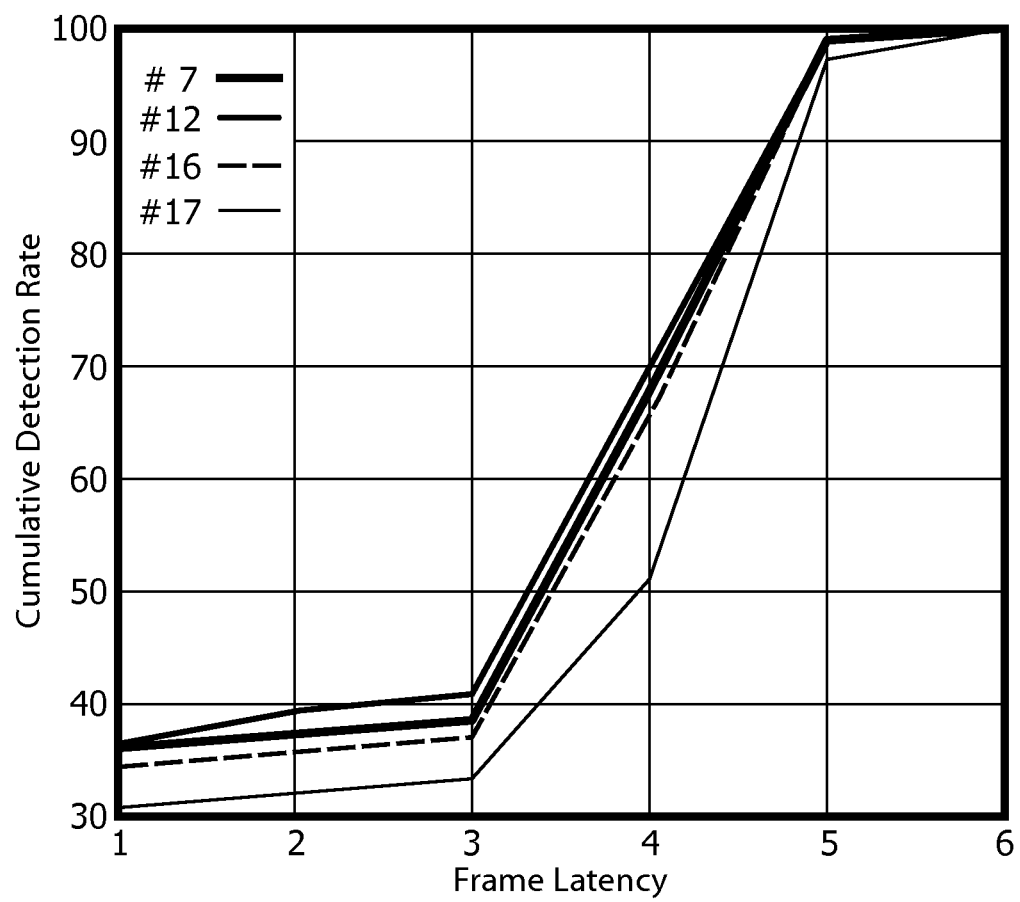
FIG. 4 is a graph showing one example of operation of the approaches described herein.

One important parameter for the AAD algorithm is the true positive rate of detection of the first occurrence of speech in a segment. This statistic is in part used to determine how quickly the detector responds to speech. FIG. 4 shows that speech is always detected by the sixth frame for several suitable set of parameters.

Table 1 shows overall accuracy rates along with true positive rate and false positive rate. The low false positive rate indicates that the algorithm is power efficient.

TABLE 1

Overall performance of one example speech AAD detector approach

|  | TPR | FPR | ACC |
|---|---|---|---|
| Performance | 96% | 21% | 82% |

Preferred embodiments of the disclosure are described herein, including the best mode known to the inventors. It should be understood that the illustrated embodiments are exemplary only, and should not be taken as limiting the scope of the appended claims.

What is claimed is:

1. An apparatus configured to distinguish speech activity from background noise, the apparatus comprising:
   an analog circuit that converts sound energy into an analog electrical signal;
   a conversion circuit coupled to the analog circuit that converts the analog signal into a digital signal;
   a digital circuit coupled to the conversion circuit, the digital circuit including an acoustic activity detection (AAD) module, the AAD module configured to receive the digital signal, the digital signal comprising a sequence of frames, each frame having a plurality of samples, the AAD module configured to obtain an energy estimate for the plurality of samples of a frame and compare the energy estimate to at least one threshold, and the AAD module configured to determine whether speech or noise is detected based on the comparison, and when speech is detected to trigger transmission of an interrupt;
   wherein the conversion circuit comprises a sigma-delta modulator that is configured to convert the analog signal into a single bit stream pulse density modulated (PDM) format;
   wherein the digital circuit comprises a decimator module that converts the single bit stream pulse density modulated (PDM) format into a pulse code modulated (PCM) format;

wherein the pulse code modulated (PCM) audio from the decimator module is stored in a buffer while the AAD module determines whether speech or noise is detected.

2. The apparatus of claim 1, wherein the AAD module is further configured to determine whether a speech hangover has occurred.

3. The apparatus of claim 1, wherein the AAD module is further configured to update the threshold as a non-linear function of a noise threshold.

4. A microphone apparatus comprising:
a sensor having an output with an electrical signal produced in response to acoustic energy detected by the sensor;
a converter having an input coupled to the output of the sensor, the converter having an output with a digital signal obtained from the electrical signal;
a buffer coupled to the output of the converter, data based on the digital signal buffered in the buffer;
a voice activity detector coupled to the output of the converter, the voice activity detector distinguishing speech-like activity from non-speech based on a comparison of energy estimates of samples of data based on the digital signal to a threshold while the data is buffered,
the threshold determined at least in part by noise statistics that are independent of noise type;
an external-device interface coupled to the buffer, wherein a wake-up signal and data delayed by the buffer are provided to the external-device interface after the voice activity detector determines the presence of speech-like activity in the frame.

5. The apparatus of claim 4,
the energy estimate includes a first energy estimate for a first frequency band and a second energy estimate for a second frequency band, the first frequency band different than the second frequency band,
the voice activity detector distinguishing speech-like activity from non-speech based on a comparison of the first energy estimate and the second energy estimate to the threshold.

6. The apparatus claim 5, the first frequency band is a full bandwidth and the second frequency band is a relatively high frequency pass band, wherein the second frequency band captures sibilant and other fricative characteristics of speech.

7. The apparatus of claim 4,
a PCM format converter coupled to the output of the converter, the PCM format converter converting a pulse density modulated (PDM) format digital signal on the output of the converter to a pulse code modulated (PCM) format digital data,
the buffer coupled to the output of the PCM format converter, PCM format digital data buffered in the buffer, and
a PDM format converter interconnecting the buffer and the external-device interface, the PDM format converter converting PCM format digital data from the buffer to PDM format digital data, wherein PDM format digital data is provided to the external-device interface after determining the presence of speech-like activity.

8. The apparatus of claim 4,
the digital signal comprising a sequence of frames, each frame having a plurality of samples,
wherein data is no longer provided to the external-device interface after the voice activity detector determines the presence of non-speech in a frame.

9. The apparatus of claim 4,
the microphone apparatus continuing to provide data to the external-device interface for a duration after the voice activity detector determines the presence of non-speech before discontinuing providing data to the external-device interface,
the duration based on a comparison of an energy estimate for samples of data, in which the presence of non-speech was determined, with a non-linear combination of a noise threshold and a speech threshold.

10. The apparatus of claim 4, the threshold having a first update rate when non-speech is determined to be present and the threshold having a second update rate when speech is determined to be present, the second update rate less than the first update rate.

11. The apparatus of claim 4, the voice activity detector updating the threshold when non-speech is determined to be present and not updating the threshold when speech is determined to be present.

12. The apparatus of claim 4, providing the wake-up signal to the external-device interface by providing the data delayed by the buffer to the external-device interface, wherein the data delayed by the buffer is interpreted as the wake-up signal.

13. The apparatus of claim 4, the buffer is a circular buffer.

14. A method in a microphone apparatus having an acoustic sensor, a converter, a buffer, a voice activity detector, and an external-device interface, the method comprising:
generating an electrical signal in response to an acoustic input at the sensor;
converting the electrical signal to a digital signal using the converter;
distinguishing speech-like activity from non-speech by comparing an energy estimate for samples of data based on the digital signal to a threshold using the voice activity detector, the threshold determined at least in part by noise statistics that are independent of noise type;
buffering data based on the digital signal in the buffer while distinguishing speech-like activity from non-speech; and
providing a wake-up signal and data delayed by the buffer to the external-device interface after determining the presence of speech-like activity.

15. The method of claim 14,
the energy estimate includes a first energy estimate and a second energy estimate,
obtaining the first energy estimate for a first frequency band and obtaining the second energy estimate for a second frequency band, the first frequency band different than the second frequency band,
distinguishing speech-like activity from non-speech by comparing the first energy estimate and the second energy estimate to the at least one threshold using the voice activity detector.

16. The method claim 15, obtaining the first energy estimate for a full bandwidth and obtaining the second energy estimate for a relatively high frequency pass band, wherein the second frequency band captures sibilant and other fricative characteristics of speech.

17. The method of claim 14, discontinuing providing data to the external-device interface after determining a presence of non-speech while providing data to the external-device interface.

18. The method of claim 17, after determining the presence of non-speech while providing data to the external-device interface, continuing to provide data to the external-device interface for a duration that is based on a comparison of an energy estimate for samples of data, in which the presence of non-speech was determined, with a non-linear combination of a noise threshold and a speech threshold.

19. The method of claim 14,
converting the electrical signal to pulse density modulated (PDM) format digital data and converting the PDM format digital data to pulse code modulated (PCM) format digital data,
buffering the PCM format digital data while distinguishing speech-like activity from non-speech, and
converting the PCM format digital data to PDM format digital data before providing the data delayed by the buffer to the external-device interface after determining the presence of speech-like activity.

20. The method of claim 14, updating the threshold at a first rate when non-speech is determined to be present and updating the threshold at a second rate when speech is determined to be present, the second rate less than the first rate.

21. The method of claim 14, updating the threshold when non-speech is determined to be present and not updating the threshold when speech is determined to be present.

22. The method of claim 14, providing the wake-up signal to the external-device interface by providing the data delayed by the buffer to the external-device interface, wherein the data delayed by the buffer is interpreted as the wake-up signal.

* * * * *